United States Patent

Hoyt et al.

[11] Patent Number: 5,125,630
[45] Date of Patent: Jun. 30, 1992

[54] APPARATUS FOR INSERTING LEADING END OF WEB DURING SPOOLING OF STRIPS OF WEB

[75] Inventors: William G. Hoyt, Churchville; Thomas J. VanNess, Palmyra, both of N.Y.

[73] Assignee: Eastman Kodak Company, Rochester, N.Y.

[21] Appl. No.: 595,130

[22] Filed: Oct. 10, 1990

Related U.S. Application Data

[63] Continuation-in-part of Ser. No. 430,560, Nov. 2, 1989, abandoned, and Ser. No. 430,386, Nov. 2, 1989, abandoned.

[51] Int. Cl.⁵ .............................................. B65H 19/28
[52] U.S. Cl. ...................................... 242/56 R; 242/78.8; 242/182
[58] Field of Search ................ 242/56 R, 67.1 R, 74, 242/182, 78.8; 226/91, 92, 93, 95

[56] References Cited

U.S. PATENT DOCUMENTS

| 4,519,53 | 5/1985 | Campbell et al. | 242/56 R |
|---|---|---|---|
| 2,796,223 | 6/1957 | Detweiler | 242/75.3 |
| 2,940,232 | 6/1960 | Wallace et al. | 53/112 |
| 3,216,638 | 11/1965 | Brickle | 226/97 |
| 3,499,614 | 3/1970 | Badum | 242/182 |
| 3,586,258 | 6/1971 | Horlezeder | 242/197 |
| 3,712,553 | 1/1973 | Napor et al. | 242/56 R |
| 3,737,113 | 6/1973 | Yabe et al. | 242/67.1 |
| 3,804,313 | 4/1974 | Davis | 242/182 X |
| 3,880,373 | 4/1975 | Cook | 242/56 R |
| 3,880,374 | 4/1975 | Reiser | 242/67.1 R |
| 3,945,036 | 3/1976 | Karsh | 242/182 X |
| 4,110,774 | 8/1978 | Krehbiel et al. | 226/91 X |
| 4,115,913 | 9/1978 | Moriya et al. | 29/450 |
| 4,345,754 | 8/1982 | Willenbring | 270/209 |
| 4,399,958 | 8/1983 | Dupont | 242/182 |
| 4,408,727 | 10/1983 | Dropczynski | 242/56 R |
| 4,448,365 | 5/1984 | Petching et al. | 242/74 X |
| 4,529,141 | 7/1985 | McClenathan | 242/56 A |
| 4,682,742 | 7/1987 | Woodley et al. | 242/56 R |
| 4,699,328 | 10/1987 | Kreeft et al. | 242/56 R |
| 4,705,226 | 11/1987 | Goetz | 242/56 R |
| 4,738,408 | 4/1988 | Odaka et al. | 242/56 R X |
| 4,770,361 | 9/1988 | Maeda | 242/67.1 R |
| 4,852,821 | 8/1989 | Harris et al. | 242/71.8 |
| 4,903,907 | 2/1990 | Yokajty et al. | 242/56 R |

FOREIGN PATENT DOCUMENTS

| 139483 | 1/1980 | Fed. Rep. of Germany | 242/182 |
|---|---|---|---|
| 1102350 | 10/1955 | France . | |
| 1133810 | 4/1957 | France | 242/182 |
| 1110545 | 4/1968 | United Kingdom . | |

OTHER PUBLICATIONS

Xerox Disclosure Journal, vol. 6, No. 4, Jul./Aug. 1981, p. 175.

Primary Examiner—Daniel P. Stodola
Assistant Examiner—John P. Darling
Attorney, Agent, or Firm—Charles E. Snee, III

[57] ABSTRACT

First vacuum box (28a) receives web from supply roll (24) and passes web to drive sprocket (26) which feeds web to second vacuum box (28b) at rate demanded by winding station (12), thereby minimizing tension transients in web during windings. Vacuum shuttle (54) grips leading end (22b) of web in transversely curved configuration to stiffen the end for delivery to slot (20) in spool (14).

4 Claims, 6 Drawing Sheets

APPARATUS FOR INSERTING LEADING END OF WEB DURING SPOOLING OF STRIPS OF WEB

CROSS-REFERENCE TO RELATED APPLICATIONS

This application is a continuation-in-part of each of co-pending, commonly assigned application Ser. No. 430,386 for Method for Spooling Film or Other Web Material filed Nov. 2, 1989 and Ser. No. 430,560 for Spooling Apparatus filed Nov. 2, 1989 by the same inventors, both applications now being abandoned.

TECHNICAL FIELD

The invention relates to spooling apparatus for a strip of web material. More particularly, the apparatus of the invention is suited for winding a strip of photographic film onto a spool prior to loading the wound spool into a cassette or magazine.

BACKGROUND OF THE INVENTION

U.S. Pat. No. 2,940,232 relates to an apparatus for spooling 35 mm photographic film. One end of a strip of film is attached to a spool by a strip of adhesive tape and then the spool is rotated to wind the strip onto the spool. The strip is cut while the trailing end is held by a pair of grippers which prevent clockspringing or unwinding of the strip until an empty magazine is slipped over the spool. In a commercial embodiment of the apparatus illustrated in this patent, the film strip is cut about six to eight inches from the spool, after which a second winding step is required to wind the trailing end of the strip onto the spool while the trailing end is gripped by a pair of rollers. While it is undesirable to have the second winding step, the second step is necessary since the strip cutter cannot be placed close enough to the spool. During the second winding step, the film may be scratched on both sides due to the use of the rollers gripping the trailing end, which may produce quality defects on the photographic film.

U.S. Pat. No. 3,586,258 discloses a method and apparatus for winding photographic film onto a spool already enclosed in a cassette or magazine. The spool has a longitudinal slot for receiving the leading end of the film and means are provided within the slot for securing the film to the spool. The magazines are advan ed to a winding station where the spools are oriented to ceive the leading end of the film, which is then driven through a slot in the magazine and into engagement with the spool. The spool is then rotated to wind a desired length of film into the magazine, after which the strip of film is cut. The apparatus is quite complicated due to the need for driving the film into the magazine, instead of first winding film onto the spool and then inserting the spool into the magazine. The leading end of the film appears to be driven through mechanical guides and therefore is subject to being scratched.

U.S. Pat No. 3,737,113 discloses another apparatus for threading film into a slot in a spool or reel in which the leading end of the film is guided closely by mechanical members which may damage the film. U.S. Pat No. 3,880,373 discloses a reel for photographic film which has a chordal slot into which the leading end of the film is inserted, the slot having a hook or barb which engages the film. In the apparatus shown in U.S. Pat. No. 3,880,374, take up reels at circumferentially spaced stations are alternately presented with the leading end of a web, by means of an oscillating mechanical guide.

U.S. Pat. No. 4,115,913 shows an apparatus for winding and loading film into magazines, in which the film is engaged by guide and drive rollers as it is wound onto the spool, thus subjecting the film to scratching along its length. Moreover, the inertia introduced into the apparatus by the rollers can limit the speed at which the film can be wound onto the spool and thus increase the time required to produce a completed magazine.

U.S. Pat. No. 4,408,727 discloses an apparatus for automatically severing a web of material when one roll is filled and reattaching the web to a subsequent core, in which a vacuum drum is used to hold the web during cutting and then deliver the cut end to the next core.

U.S. Pat. No. 4,519,553 discloses an apparatus for winding film such as typewriter ribbon within a cassette, in which a vacuum probe grips the leading end of the film and presses it radially against a preapplied adhesive on the core of the spool. Because the film apparently is gripped at its very end, the leading end cannot be inserted into a slot in the spool, but must be pressed in place on the exterior of the core. A single vacuum box is provided in the path of the film to the cassette; however, it appears that tension transients caused by upward and downward movement of the film within the vacuum box would be transmitted directly through the film during winding.

In the apparatus of U.S. Pat. No. 4,529,141, a movable shuttle carries a vacuum roller against which the web is cut when one roll is full, after which the vacuum roller delivers the leading end of the web to the next roll. U.S. Pat. No. 4,682,742 shows an apparatus for loading tape into a cassette in which suction is used to hold the tape in place for cutting and application of leaders, using several shifting and rotating blocks. U.S. Pat. No. 4,699,328 shows yet another apparatus for loading tape into a cassette, in which movable vacuum pads are used to hold the tape for cutting and splicing. In the apparatus disclosed in U.S. Pat. No. 4,705,226, a suction cup array is used to hold the cut end of a web until a fresh roll has been mounted for attachment to the cut end. U.S. Pat. No. 4,770,361 shows an apparatus for feeding a web into a slotted take up core.

While such prior art apparatus have experienced a certain measure of acceptance, a need has continued to exist for web winding apparatus which can deliver the web, cut it and attach it to a spool or core without damaging either side of the web, which can minimize tension transients applied to the web during winding and which is capable of high speed operation under such conditions.

SUMMARY OF THE INVENTION

An object of this invention is to provide an apparatus for spooling strips of web material such as a strip of photographic film in which the leading end of the strip is delivered to the spool in a way which avoids scratching of the strip and which controls the leading end of the strip after it has been cut following the preceding spooling operation. Another object is to avoid contact with the strip by rollers or other members that could scratch the strip while the strip is being wound onto the spool. A further object of the invention is to wind a strip onto a spool during a single winding step and to effect such winding without introducing undesirable tension transients into the strip during winding. A still further object of the invention is to reduce the cylce time required for winding a strip onto a spool. Yet another object of the invention is to increase the reliability of attachment of the leading end of the strip to a spool of the type having attachment elements, such as hooks or teeth, within a slot in the core of the spool. Still another object of the invention is to provide such an apparatus which can spool strips of material of different lengths, without requiring changes in the relative positions of the elements which cut the strips and feed their leading ends to the spool. Yet another object of the invention is to provide such an apparatus which cuts the film so close to the spool that a second winding step is not required to complete winding of the spool.

The apparatus according to the invention is useful for spooling strips of web material of indeterminate length. Such apparatus typically comprises a supply of such web material, a winding station for receiving an empty spool having a core with a longitudinal slot for receiving an end of such a strip, means for rotating such a spool to wind such a strip onto such a spool, means for guiding such a web from the supply to the winding station and means for cutting such a web after such a strip has been wound onto such a spool. In the improvement according to one embodiment of the invention, a first vacuum box means is provided between the supply and the means for guiding, for receiving a first length of such a web at least as long as such a strip and maintaining tension on such a web. Drive means are provided for withdrawing such a web from the first vacuum box means at a speed corresponding to the demand of the winding station. A second vacuum box means is provided between the drive means and the winding station for receiving a second length of such a web and maintaining tension on such a web. As a result of this arrangement, tension transients, which are induced in such a web due to variations in the height of the loop of web in the first vacuum box means as the drive means operates to deliver such a strip to said winding station, are isolated by the drive means from such a web in the second vacuum box means, so that the height of the loop of such a web in the second vacuum box means remains essentially constant. An air bar means may be provided between the second vacuum box means and the winding station for supporting such a web as such a web leaves the second vacuum box means.

In another preferred embodiment of the invention, the improvement comprises vacuum means for gripping such a strip between the second vacuum box means and the means for cutting, the vacuum means comprising a convex surface through which vacuum is applied to grip such a strip and cause such a strip to assume a transversely curved profile, thereby stiffening the leading end of such a strip to facilitate insertion into such a longitudinal slot; and means for moving the vacuum means between a first position where such a web may be gripped prior to being cut by the means for cutting and a second position where the leading end may be inserted into such a longitudinal slot. This means for moving preferably comprises a rod coupled to the vacuum means, means for guiding the rod for substantially linear movement and means for driving the rod in cooperation with the means for guiding to move the vacuum means between the first and second positions. Means may be provided for initially moving the means for guiding toward such a strip to bring the vacuum means into the first position and then actuating the means for cutting before the vacuum means is moved to the second position by the means for moving.

Preferably the vacuum means, when in the second position, is located with respect to the winding station such that rotation of such a spool peels such a strip away from the vacuum means to permit the vacuum means to be moved back to the first position while winding continues. When the web material comprises perforations extending along the side edges thereof, means may be provided on the vacuum means for engaging a portion of the perforations to prevent such a strip from slipping off the vacuum means during insertion of such lead end into such a longitudinal slot. To ensure that the lead end of such a strip is fully released from such means for engaging, the vacuum means may be provided with means for directing a puff of air between the vacuum means and the lead end.

BRIEF DESCRIPTION OF THE DRAWINGS

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the preferred embodiments of the invention, reference being made to the drawings in which the same reference numerals identify the same elements of structure in each of the several Figures.

A spooling apparatus 10 according to the invention includes a face plate 11 which suports the several elements of the apparatus. A winding station 12 is provided where a strip of film or other web material can be wound onto a spool 14. Where photographic film is being processed, the spool may be of the type disclosed in U.S. Pat. No. 4,852,821. As illustrated, spool 14 comprises a pair of end flanges 16, most clearly seen in FIG. 3, and a core 18 to which the leading end of the film is attached. A slot 20 extends through core 18 and the leading end of the film is inserted into the slot. Spool 14 also may have hooks or teeth, not illustrated, within slot 20 for engaging openings in the leading end of the film when the film is inserted into slot 20. Spool 14 is rotated counter-clockwise about its longitudinal axis at winding station 12 by a suitable drive mechanism, illustrated diagrammatically at 21, to wind film onto core 18.

An indeterminate length 22 of web travels along a web path leading from a supply roll 24 to winding station 12. More specifically, web 22 is unwound from roll 24 and advanced into a first conventional vacuum box 28a. A sprocket 26 pulls web 22 from vacuum box 28a at a rate corresponding to the demand of winding station 12. As the loop of web in vacuum box 28a rises and falls in response to the demand of winding station 12, tension transients are introduced into web 22 which, if allowed to reach winding station 12, could cause unwanted variations in the tightness of the web wound on core 18. Such variations in tightness could cause abrasion or pressure desensitization of web 22, which are undesirable for photographic film. Sprocket 26 acts not only to drive web 22 forward at the rate required by winding station 12, but also to isolate winding station 12 from such tension transients. From sprocket 26, the web passes into a second conventional vacuum box 28b, where the vacuum in the box applies a slight tension to the web, but the length of the loop of web in box 28b remains essentially constant. The strip of web in vacuum box 28a is at least as long as the longest strip of web to be wound onto spool 14; however, the length of the strip of web in vacuum box 28b is chosen just to ensure that the web remains in the vacuum box during operation to maintain the desired tension. As the web leaves vacuum box 28b, it passes over an air bar 30 which supports the web on a layer of air as the web is bent 90 degrees around the air bar. The web then travels along a substantially straight line path to spool 14. Where photographic film is being spooled, the emulsion side of the film is the top side as viewed in FIGS. 1, 2, 4 and 5.

Along the web path between air bar 30 and winding station 12, there is a die 32 below the web path and a punch 34 above the web path. Die 32 is rigidly connected to face plate 11 and is located below the web path as the web approaches winding station 12. Preferably, die 32 is positioned just below the lower edges of end flanges 16 on spool 14, for a purpose to be discussed subsequently. Punch 34 is pivotably connected by a bracket 36 to one end of a connecting rod 38, the other end of which is pivotally connected to one end of a crank arm 40. The other end of crank arm 40 is secured to a shaft 42 mounted for oscillating or rocking movement relative to face plate 11. When shaft 42 is rotated clockwise from the position of FIG. 1, it drives connecting rod 38, bracket 36 and punch 34 downwardly to bring punch 34 into contact with die 32 to cut web 22. When shaft 42 is rotated in the opposite direction, crank arm 40 raises punch 34 to separate it from die 32 so that the web can be advanced between the punch and die.

Figure 1:
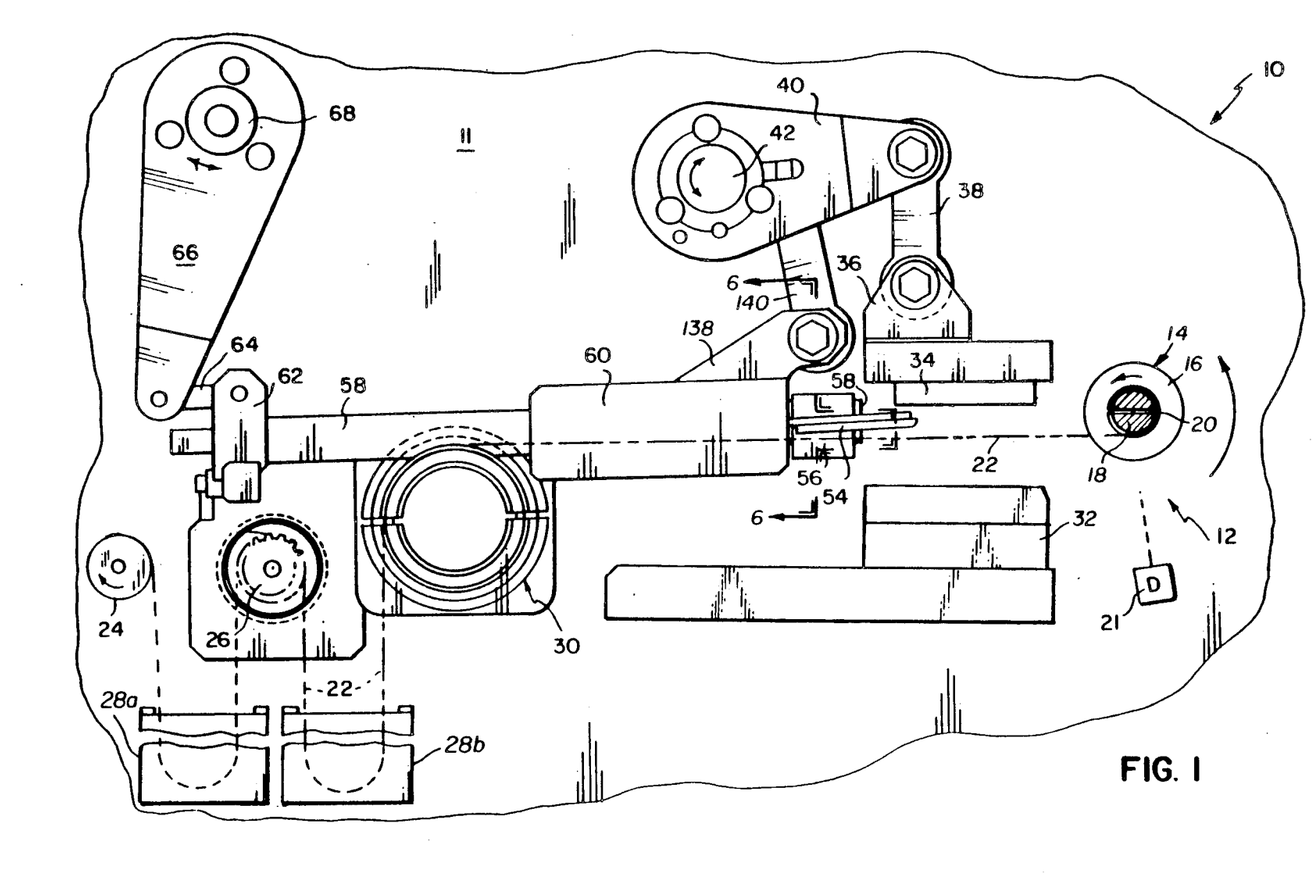
FIG. 1 shows a fragmentary elevation view of an apparatus for feeding a length of web from a supply to a winding station.
Figure 3:
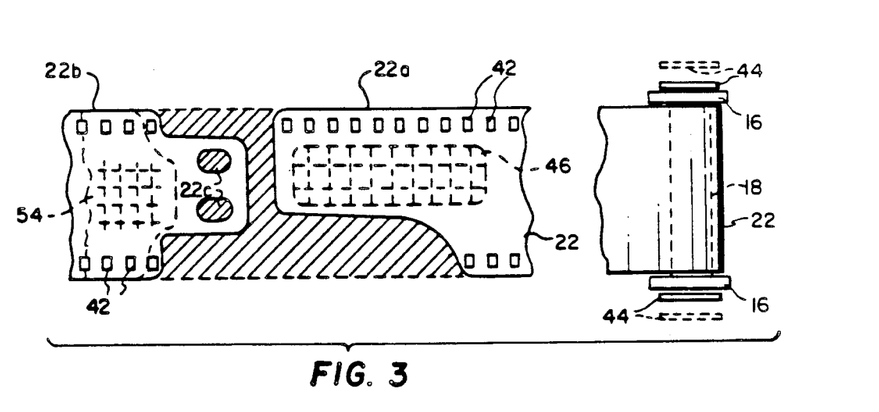
FIG. 3 shows a view of the underside of the leading and trailing ends of successive strips of web after the web has been cut, illustrating the positions of the web gripping elements relative to the leading and trailing ends.

FIG. 3 illustrates one preferred arrangement for cutting photographic film strip 22. The film is shown from below the film path, after the film has been cut. The cross-hatched area shown in FIG. 3 represents the shape of the portion of the film that is severed and removed entirely by the punch and die. Removal of this portion leaves a trailing end 22a on the strip of film that has just been wound onto spool 14. Trailing end 22a becomes the leading end of the film after the wound spool has been loaded into a magazine. Trailing end 22a has an elongate tongue along one side and is cut away along the other side. Similarly, on the opposite side of the removed portion of film is formed a leading end 22b for the next strip of film to be wound onto a spool. Leading end 22b comprises a tongue portion which typically is centrally located on the film and may have two elongated openings 22c, also formed by punch 34 and die 32, which are adapted to be engaged by teeth in slot 20 in the conventional manner. Film strip 22 may have a plurality of perforations 42 along both side edges thereof which can be used for advancing the film by sprocket 26 and by mechanisms in a camera, not illustrated. As shown in FIG. 1, the web path upstream of winding station 12 is essentially free of any mechanism other than die 32 and punch 34. This allows the punch and die to be positioned close enough to winding station 12 so that the web is cut, trailing end 22a is just the correct length for the leader of the web after the spool is loaded into a magazine. Thus a second winding step is not required after the web has been cut.

After the desired length of web has been wound onto spool 14 and web 22 has been cut by the punch and die in a manner to be described shortly, the wound spool needs to be removed from winding station 12 so that a new empty spool can be delivered for receiving the next strip of web. During removal of the wound spool, it is important that trailing end 22a be held in a particular relationship to spool 14 so that the wound spool can be properly inserted into a magazine with trailing end 22a projecting outwardly through a slot in the wall of the magazine. This is accomplished by means of a pair of gripper arms 44 and a vacuum platen 46, which can be swung into the position shown in FIG. 2. As seen best in FIG. 3, gripper arms 44 may be located adjacent to spool flanges 16. During winding of the strip of web onto the spool, the arms occupy the positions illustrated in phantom where they are spaced from the spool. When winding has been completed, the web has been cut and vacuum platen 46 has acquired trailing end 22a, arms 44 can be moved into engagement with the outer surfaces of the spool flanges to grip the wound spool, as shown in solid lines in FIG. 3, and hold it during removal of the spool from winding station 12.

Vacuum platen 46 is located above the web path and thus is engageable with the emulsion side of a photographic film which by convention is always wound with the emulsion side facing the core of the spool. The shape and location of the contact surface of platen 46 are shown in FIG. 3. Platen 46 is located primarily over trailing end 22a of the strip and does not contact the portion of a photographic film strip where images are to be formed. This prevents platen 46 from scratching any portion of the image area. Thus, when vacuum is applied to platen 46 and its contact surface is brought into engagement with trailing end 22a, the trailing end is gripped by the platen, thus preventing the strip from clockspringing loose from spool 14. Arms 44 and platen 46 are coupled together, as shown diagrammatically at 50 in FIGS. 2 and 4, and are movable upwardly and downwardly from the position illustrated in FIG 2, as indicated at 52. Also, arms 44 and platen 46 can be swung away from winding station 12 for removal of a wound spool, as shown in FIG. 4.

Figure 2:
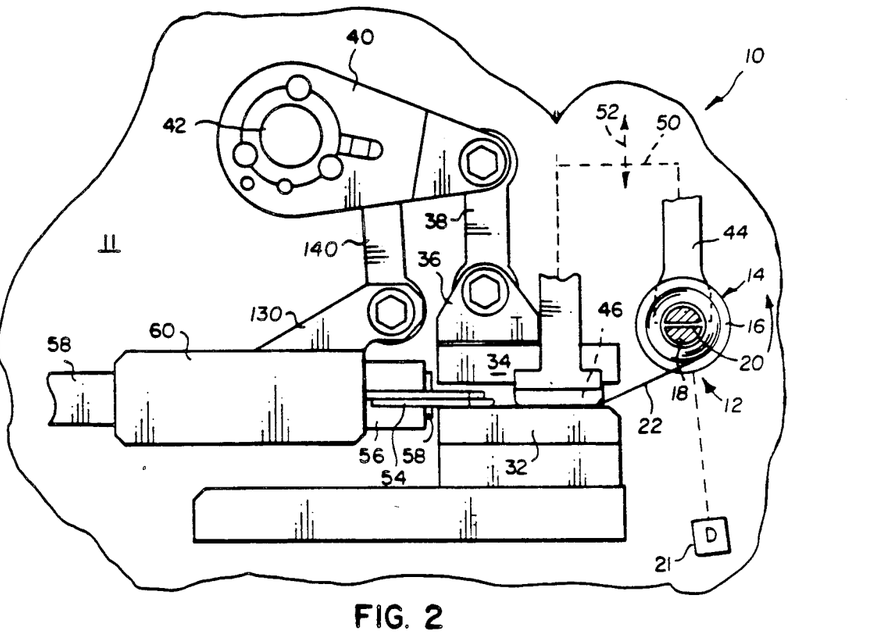
FIG. 2 shows a portion of the apparatus of FIG. 1 as positioned for cutting the web after a predetermined length thereof has been wound onto the spool and also shows a mechanism for removing the wound spool.
Figure 4:
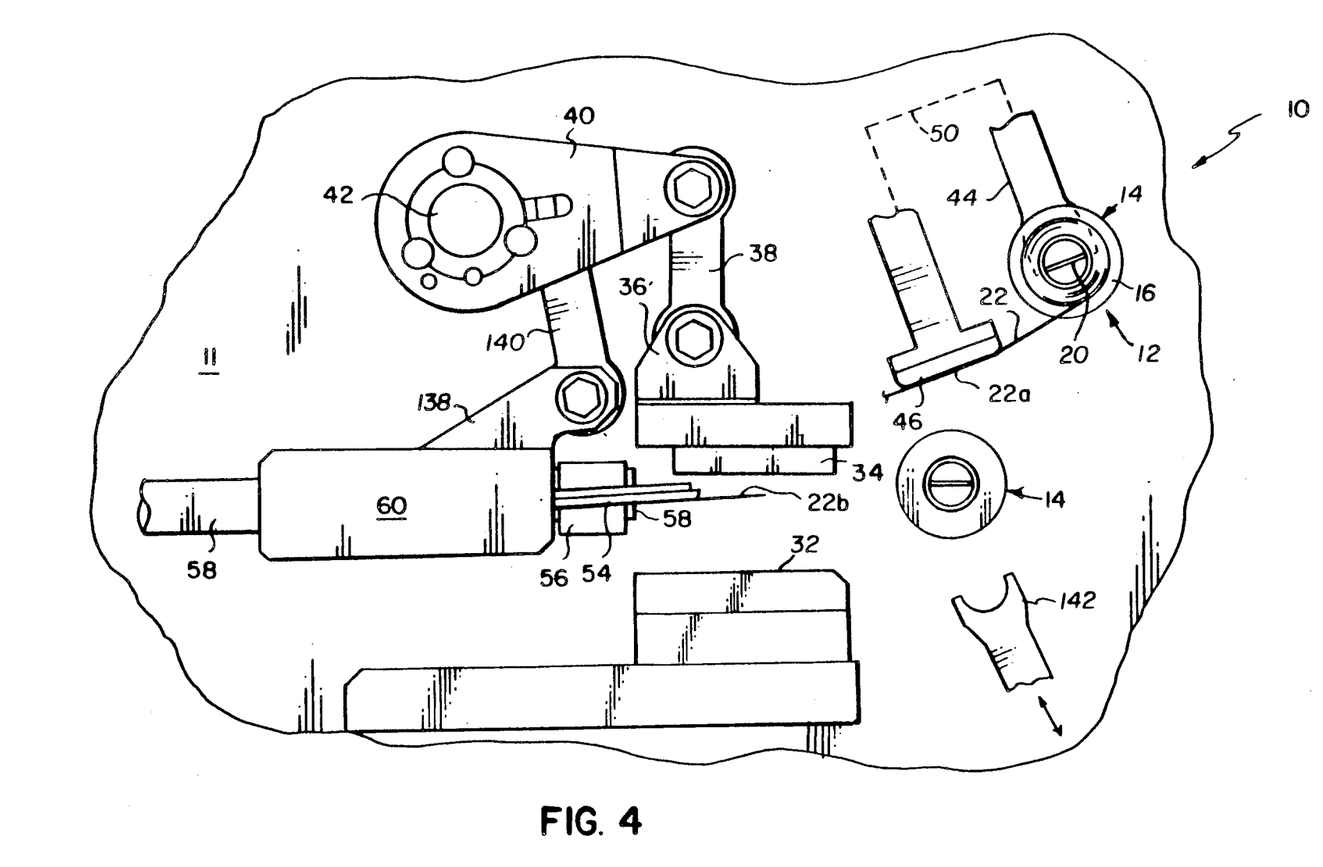
FIG. 4 shows a portion of the apparatus of FIG. 1 as positioned after cutting of the web and removal of the previously wound spool.

When a wound spool 14 has been removed and a new spool has been positioned at winding station 12, as shown in FIG. 4, leading end 22b of the strip needs to be advanced from a position between punch 34 and die 32 into slot 20 of the new spool. This movement is acomplished by a vacuum shuttle 54. As shown in FIGS. 2 and 3, shuttle 54 is positioned above the path for film 22 and relative to punch 34 and die 32, so that it will engage the emulsion side of a photographic film at the location which forms leading end 22b of the strip. As in the case of platen 46, shuttle 54 contacts a photographic film only in an area that is outside the image area.

Vacuum shuttle 54 is connected by a bracket 56 to one end of a splined shaft 58 which extends through a guide member 60 and, as shown in FIG. 1, is connected at its opposite end to a bracket 62 which is pivotably connected to one end of a connecting rod 64. The other end of connecting rod 64 is pivotably connected to a crank arm 66 which is mounted on a shaft 68 mounted for oscillating or rocking movement relative to face plate 11. When shaft 68 is rotated counter-clockwise, rod 58 is driven from left to right as viewed in FIG. 1. This moves shuttle 54 to the right from the position of FIG. 4, where leading end 22b has just been cut, to that of FIG. 5, where leading end 22b has been inserted into slot 20 of spool 14. Conversely, when shaft 68 is rotated clockwise, rod 58 is driven from left to right to return shuttle 54 to the position of FIGS. 1 and 4.

Figure 8:
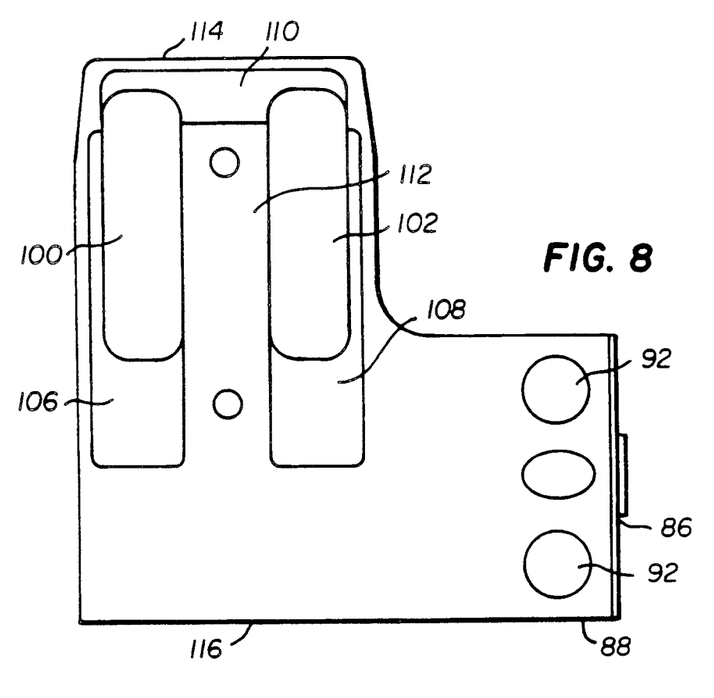
FIG. 8 shows a bottom plan view of the tip mounting plate for the vacuum shuttle tip, with the shuttle tip removed.

FIGS. 6 to 9 illustrate the unique geometry of vacuum shuttle 54 which facilitates its acquiring leading end 22b and inserting the leading end into slot 20. Spline shaft 58 is provided with a central bore 74 through which vacuum or pressurized air may be applied by conventional means not illustrated. At least one radial port 76 leads from bore 74 into a small plenum 78 provided in bracket 56 which is attached to the end of shaft 58. A seal plate 80 closes the otherwise open lower end of plenum 78. On its side facing away from face plate 11, bracket 56 is provided with a pair of upwardly angled passages 82, only one of which is visible in FIG. 6. These passages extend to an essentially horizontal surface 84 on which rests the inner end 86 of the mounting plate 88, shown in FIGS. 7 and 8, for the tip 90 of vacuum shuttle 54, shown in FIG. 9. Mounting plate 88 comprises a pair of through bores 92 which mate with passages 82. Between bores 92, an upwardly extending boss 94 is provided which includes a central bore for passage of an attachment screw 96 which extends into a tapped bore, not illustrated, in bracket 56. Mounting plate 88 is generally L-shaped and includes in its upper surface reliefs 96,98 which extend from bores 92 along one leg of the mounting plate away from bracket 56 and down the other leg of the mounting plate away from bracket 56 and down the other leg of the mounting plate to a pair of elongated through bores 100,102. In use, the entire upper openings of reliefs 96,98 are closed by a seal plate 104, so that closed passages are defined from bores 92 to bores 100,102. On its underside, as shown in FIG. 8, mounting plate 88 comprises a pair of elongated reliefs 106,108 which extend to the rearmost ends of through bores 100,102 and a transverse relief 110 which connects the forward ends of through bores 100,102. Extending between bores 100,102 on both sides of mounting plate 88 is a central rib or land 112 having a pair of longitudinally spaced tapped holes for attachment of tip 90 of vacuum shuttle 54.

Figures 6, 9:
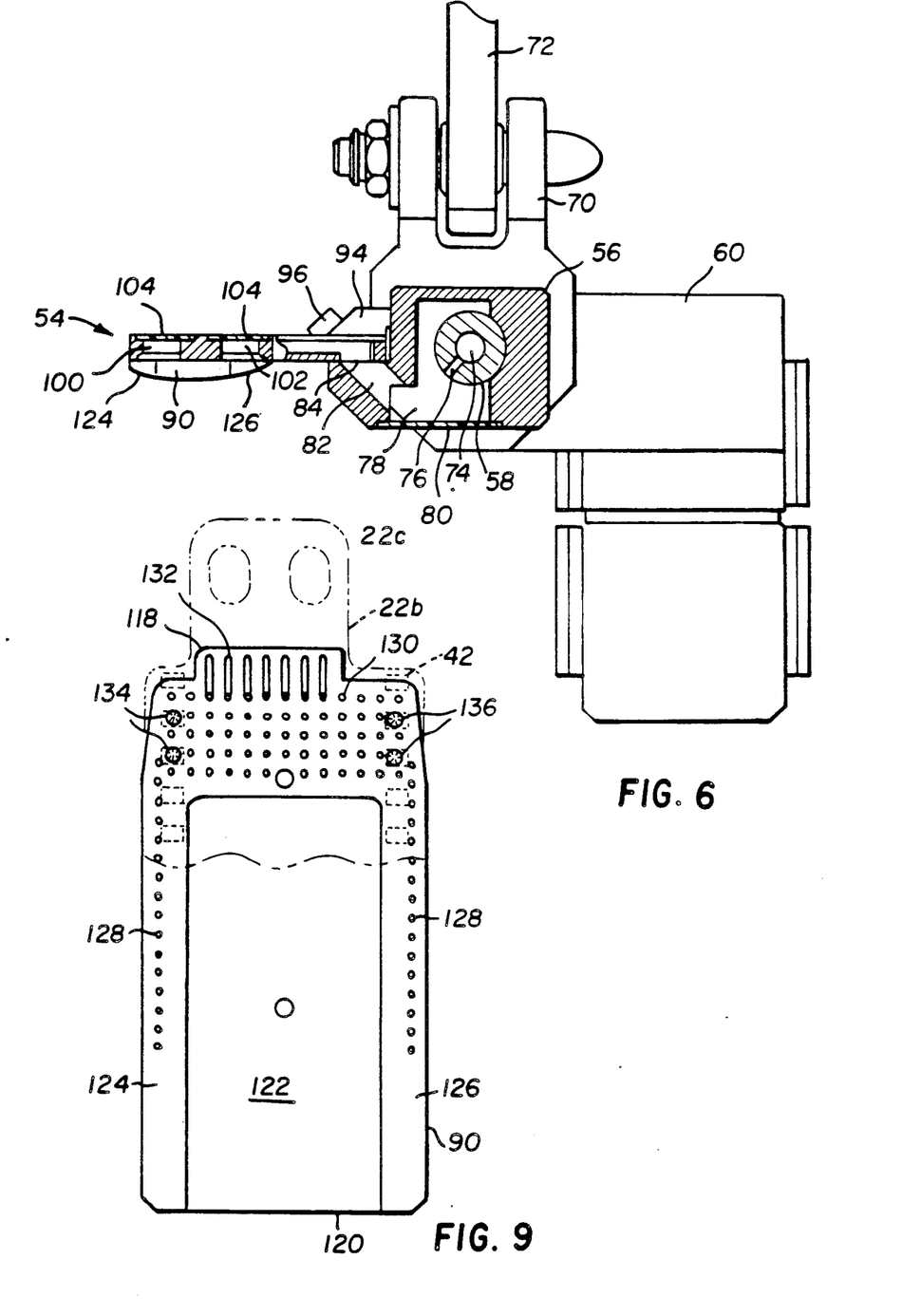
FIG. 6 shows a view, partially in section, taken along line 6—6 of FIG. 1.
FIG. 9 shows a bottom plan view of the shuttle tip, with the leading end of a strip illustrated in phantom.
Figure 7:
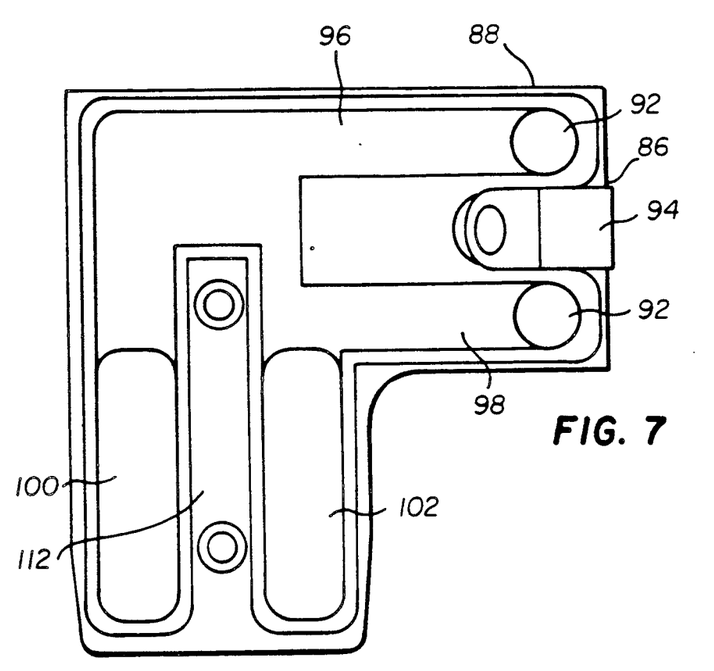
FIG. 7 shows a top plan view of the tip mounting plate for the vacuum shuttle tip, with its seal plate removed.

As seen in FIGS. 6 and 9, tip 90 comprises an elongated plate-like body sized to fit on the underside of mounting plate 88, completely covering through bores 100,102 and reliefs 106,108 and extending from the forward edge 114 to the rear edge 116 of mounting plate 88. The underside of tip 90 is curved transversely along its entire length as seen in FIG. 6; and, for 35 mm photographic film, a radius of curvature of approximately 5.08 cm (2.0 in) is preferred. At its forward edge, tip 90 is provided with a lip 118 which extends slightly out onto the tongue of leading end 22b in which apertures 22c are formed. Extending forward from the rear edge 120 of tip 90 is a rectangular recess 122 which is somewhat wider than the image bearing portions of a photographic film strip and is provided to prevent tip 90 from scratching or otherwise marring such image bearing portions during use. On either side of recess 122 is provided an elongated support land 124,126 also having a transversely curved surface, as just described. A row of apertures 128 extends through the body of tip 90 along each of lands 124,126 just below through holes 100,102 and reliefs 106,108, the rows being spaced transversely just outside the locations of perforations 42 in the film strip. Between the forward end of recess 122 and lip 118 an array of apertures 130 is provided which extends through the body of tip 90 just below transverse relief 110. Apertures 130 just to the rear of lip 118 are provided with elongated reliefs 132 extending forward along the underside of lip 118. Tip 90 is attached to mounting plate 88 by means of suitable screws into the tapped holes in central rib 112. Tip 90 may be made from a material such as high chrome stainless steel; however, it is preferred that its convex surface be blasted with 160 grit to improve vacuum adhesion.

In use, vacuum is applied through bore 80 in shaft 58, through passages 82, reliefs 96,98, through holes 100,102 and apertures 128,130. Thus, when tip 90 is brought into close proximity to or contact with the strip is sucked firmly against the curved underside of tip 90. To facilitate the application of vacuum through apertures 128,130, the passages communicating between plenum 78 and apertures 128,130 should have a flow area at least equal to the combined flow areas of apertures 128,130. A photographic film, thus held and curved, has substantial beam strength which facilitates its being translated to and inserted into slot 20 on spool 14. In some applications of the invention, it may be desirable to provide additional longitudinal support for the film strip while it is being translated and inserted, to prevent the film strip from slipping longitudinally along the surface of tip 90. For this purpose, pairs of pins 134,136 may be provided on each side of tip 90 within the array of apertures 130 and in position to engage pairs of perforations 42 in the film strip. Preferably, such pins have flats on their forward edges, as illustrated, to provide line contact with the leading edges of the perforations. However, if pins 134,136 are used, release of the leading end of the film strip from vacuum shuttle 54 can better be achieved by turning off the vacuum through apertures 128,130 and applying a puff of compressed air to push the leading end away from the pins. Even where pins 134,136 are not used, applying a flow of air through the apertures during withdrawal of vacuum shuttle 54 can help to alleviate any flutter of the web.

Vacuum shuttle 54 preferably is moved into and out of engagement with film strip 22 synchronously with movement of punch 34 toward and away from die 32. This is accomplished by means of an arm 138 fixedly attached to guide 60 at one end and pivotably attached at the other end to one end of a connecting rod 140. The other end of connecting rod 140 is pivotably connected to crank arm 40 at a location, not illustrated, between shaft 42 and the pivotable connection to rod 38. Thus when shaft 42 is rotated in a clockwise direction, both punch 34 and shuttle 54 are moved downwardly synchronously. Because shuttle 54 starts moving from a position closer to the web path than the position of punch 34 is to die 32, shuttle 54 will engage web 22 prior to the time that punch 34 reaches die 32, thus ensuring the web is gripped by shuttle 54 before the web is cut.

Operation of the spooling apparatus will now be described. Initially, it will be assumed that the parts are in the position illustrated in FIG. 1, that web 22 has been threaded from supply roll 24 along its path to winding station 12, and that leading end 22b has been attached to spool 14. The spool is then rotated counter-clockwise by drive mechanism 21 to wind a predetermined length of web onto the spool. The length of web can be metered by optical sensors, not illustrated, located along the web path. When the predetermined length of web has been wound onto the spool, drive mechanism 21 stops and the web is suspended momentarily between spool 14 and air bar 30. Because die 32 is positioned below spool 14, web 22 is not bent over the right hand edge of the die, as viewed in FIG. 2, thus ensuring that the web does not drag or bend over the edge of the die during winding or cutting, respectively, regardless of the length of the strip being wound. As a result of this arrangement, it is not necessary to change the relative positions of the die and the spool as strips of different lengths are wound. Arms 44 and vacuum platen 46 are swung downwardly into position to engage the spool flanges and the trailing end 22a adjacent the spool. Simultaneously, shaft 42 is rotated clockwise to bring vacuum shuttle 54 into engagement with web 22 just after arms 44 and platen 46 reach their positions just described and just before punch 34 engages die 32 to cut the web and form and leading ends 22a and 22b. Arms 44 then close to grip the wound spool. Due to the locations and sequence of actuation of vacuum platen 46 and vacuum shuttle 54, both ends 22a and 22b are gripped securely before the web is cut.

After the web is cut, shaft 42 is rotated in the counter-clockwise direction to lift punch 34 away from die 32 and raise vacuum shuttle 54 and leading end 22b to the positions illustrated in FIG. 4. Then arms 44 and vacuum platen 46 are swung away from winding station 12 to remove the wound spool while gripping the trailing end of the strip in a predetermined relationship to the wound spool. The wound spool can be transferred in this manner to a position where it is loaded into a magazine, or a magazine is formed around the wound spool. As soon as the wound spool has been swung away from winding station 12, an empty spool 14 is delivered to the winding station by a pair of arms 142, only one of which is shown in FIG. 4. The empty spool can either be rotated to a position for receiving leading end 22b while the spool is in winding station 12 or preferably the empty spool can be preoriented before it is gripped by arms 142 and presented to winding station 12.

Figure 5:
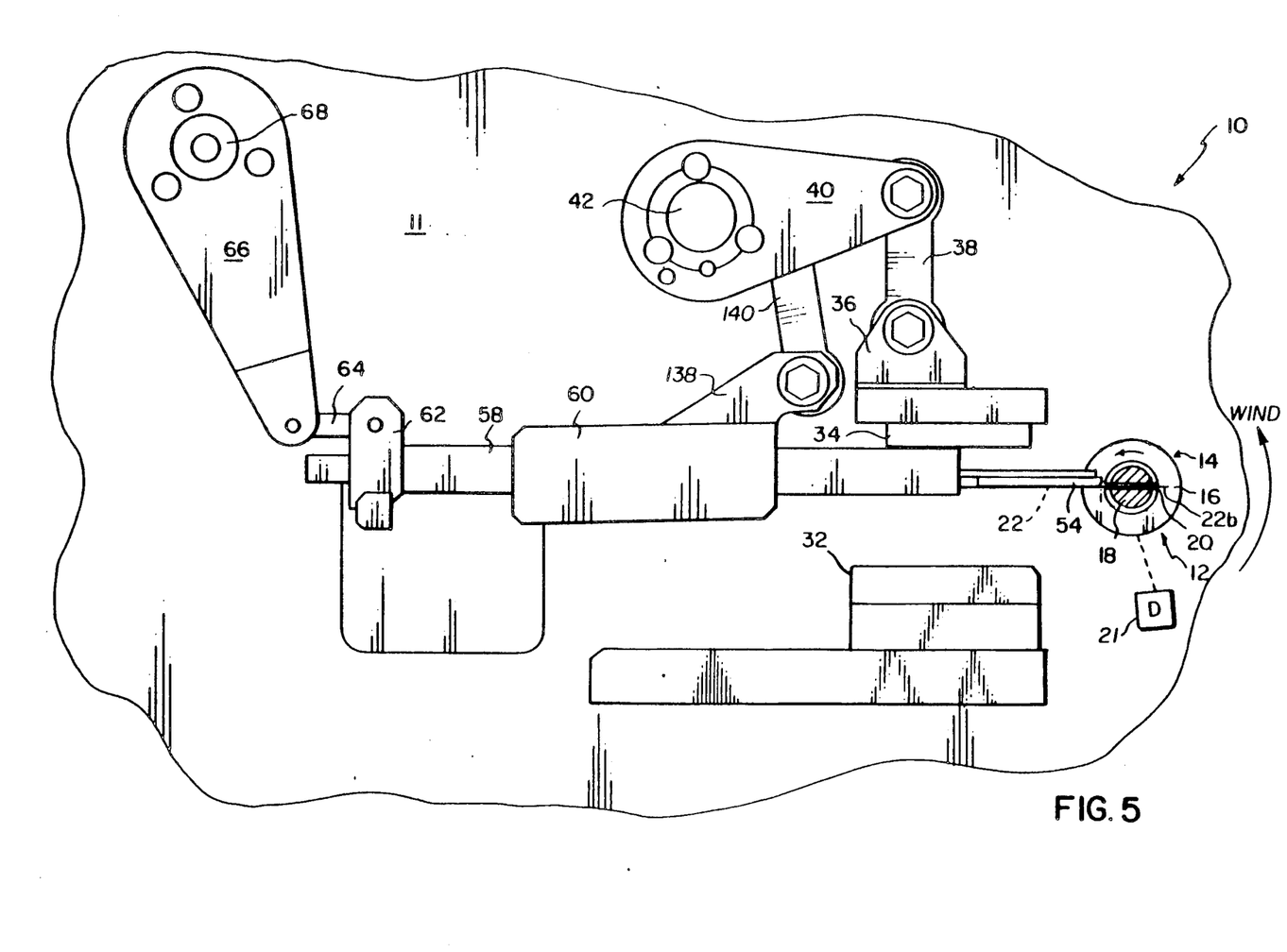
FIG. 5 shows a fragmentary elevation view of an apparatus for feeding web in which the leading end of the web has been advanced and inserted into the slot of the spool.

When the empty spool is in position in winding station 12, vacuum shuttle 54 is driven from the position of FIG. 4 to that of FIG. 5, by rotation of shaft 68. This movement inserts leading end 22b into slot 20 in the empty spool. Because tip 90 causes end portion 22b to assume a transversely curved shape, it is stiff enough to be inserted readily into slot 20. Then the vacuum on shuttle 54 is released and shaft 68 is rotated in a clockwise direction to return vacuum shuttle 54 to the position of FIG. 1 where it lies above the web path. Spool 14 then is rotated in the counter-clockwise direction to wind a predetermined length of web onto the spool. Rotation of the spool can be initiated at the time the vacuum on shuttle 54 is released, or even before the vacuum is released. In either event, as soon as spool 14 begins to rotate, the web is peeled downwardly and away from shuttle 54. Because shuttle 54 is located above the web path and spool 14 is rotated to pull the web below the web path, the web is peeled from the underside of the shuttle without dragging over the leading edge of the shuttle. This location of the shuttle and location of the web during winding permit shuttle 54 to be returned from the position of FIG. 5 to that of FIG. 1 while the web is being wound onto the spool, without the shuttle's scratching the web. The ability to return the shuttle during the winding step also shortens the overall cycle time.

The spooling apparatus of the invention permits a predetermined length of web to be rapidly and efficiently wound onto a spool and the spool to be removed from the winding station in a very short time cycle. This is due, in part, to the fact that there is very little inertia in the system that needs to be overcome when the web is being wound onto the spool. More specifically, the length of web to be wound is pulled from vacuum box 28b and over air bar 30, both of which elements have very low inertia, particularly since the length of the loop in vacuum box 28b remains essentially constant. On the other hand, if the loop in vacuum box 28b were permitted to vary in length during the winding process, the movement of the loop require it to move a column of air in the vacuum box, thereby inducing undesirable tension transients in the web during winding. The low inertia of the system also permits the web to be wound at high velocities. Also, the spooling apparatus eliminates drive rollers and idler rollers in contact with the web, thus avoiding defects caused by such rollers.

The relationship between the punch and die and the winding station permits the web to be cut so that trailing end 22a is the correct length for loading the wound spool into a magazine without a second winding step. When the web is cut, both the trailing and leading ends of the web are gripped securely by vacuum devices to provide constant control of the ends of the web. The trailing end of the strip is held in a predetermined relationship to the wound spool as the wound spool is swung away from the winding station and delivered to a separate station where it is loaded into a magazine or a magazine is formed around the wound spool.

The leading end of the web is quickly and accurately driven into the slot of the spool by the vacuum shuttle which firmly grips and transversely curves the web to give it suitable rigidity for insertion. The shuttle travels along a predetermined path relative to the slot in the spool. As shown in FIGS. 3 and 9, shuttle 54 is very close to openings 22c in leading end 22b, thus increasing the reliability of the threading of the film into the slot of the spool and the reliability of the attachment of the strip to the spool. The close proximity of the shuttle to the winding station when the web is cut also reduces cycle time by enabling the leading end of the web to be fed to the spool quickly over a short distance.

Both vacuum shuttle 54 and vacuum platen 46 are located above the film path and thus contact the emulsion side of a photographic film. The emulsion side of the film, under certain conditions of humidity, assumes an upwardly concave shape, which facilitates gripping of the film by the convex underside of vacuum shuttle 54 and also by vacuum platen 46. Also, when the shuttle grips the film, it maintains or establishes an upwardly concave shape to end portion 22b, which tends to increase the beam strength of the film, thereby contributing to the ability to push the film into the slot of the spool. Due to the space available upstream of the punch and die, the shuttle can grip end portion 22b closer to openings 22c, thus also improving reliability when feeding end portion 22b into the slot. In addition, by locating the shuttle above the web path, the web is peeled from the shuttle when the spool has rotated about 90 degrees, thus assuring separation of the web from the shuttle and permitting the shuttle to be returned to the position of FIG. 1 while the web is being wound onto the spool. Location of the shuttle and punch above and the die below the film path also makes it easier to accommodate different lengths of strips to be wound. For longer strips, the trailing end of the strip leaves the wound spool at a lower level, relative to the die, than for shorter strips. By putting the shuttle and punch on the same side, it is possible to bring the trailing ends of different length strips to a common plane at the die before the punch cuts the web. Also, if the shuttle were on the underside of the web and had to raise the web above its path to permit the shuttle to move past the die, there would be a greater danger of cinching or over tightening the web on the spool.

Operation of the spooling apparatus has been described primarily in connection with the winding of photographic film onto a spool. However, the invention also can be used for spooling webs of other types of material. The invention has been described in detail with particular reference to a preferred embodiment, but it will be understood by those skilled in the art that variations and modifications can be made without departing from the spirit and scope of the invention.

We claim:

1. In an apparatus for spooling web of indeterminate length having perforations along the side edges thereof, said apparatus being of the type including a supply of said web, a winding station for receiving an empty spool having a core with a longitudinal slot for receiving a leading end of said web, means for rotating said spool to wind said web onto said spool, means for guiding said web from said supply to said winding station and means for cutting said web after a strip thereof has been wound onto said spool, the improvement comprising:

vacuum means for gripping said web between said supply and said means for cutting, said vacuum means comprising a convex surface through which vacuum is applied to grip said web behind said leading end and cause said web to assume a transversely curved profile, thereby stiffening said leading end of said web so that said leading end extends unsupported beyond said vacuum means to facilitate insertion into said longitudinal slot;

means on said vacuum means for engaging a portion of said perforations to prevent said web from slipping off said vacuum means during insertion of said leading end into said longitudinal slot; and means for moving said vacuum means between a first position where said web may be gripped prior to being cut by said means for cutting and a second position where said leading end may be inserted into said longitudinal slot.

2. Apparatus according to claim 1, further comprising means for releasing said web from said means for engaging by applying air pressure between said web and said vacuum means.

3. Apparatus according to claim 1, wherein said means for engaging comprises pairs of pins extending into said perforations.

4. Apparatus according to claim 1, wherein said vacuum means, when in said second position, is located on one side of said web at said winding station, said spool is rotated by said means for rotating away from said one side toward the other side of said web to cause said web to peel away from said vacuum means and said vacuum means is moved by said means for moving back to said first position during winding of said spool.

* * * * *